United States Patent
Adema et al.

(10) Patent No.: US 11,445,155 B1
(45) Date of Patent: Sep. 13, 2022

(54) DISPLAY SYSTEM WITH ANGULARLY SEPARATED LASERS

(71) Applicant: GOOGLE LLC, Mountain View, CA (US)

(72) Inventors: Daniel Adema, Kitchener (CA); Ian Andrews, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/208,810

(22) Filed: Mar. 22, 2021

(51) Int. Cl.
*H04N 9/31* (2006.01)
*G02B 27/01* (2006.01)
*G02B 26/10* (2006.01)

(52) U.S. Cl.
CPC ......... *H04N 9/3152* (2013.01); *G02B 26/105* (2013.01); *G02B 27/0172* (2013.01); *H04N 9/3161* (2013.01); *H04N 9/3164* (2013.01); *G02B 2027/0178* (2013.01)

(58) Field of Classification Search
None
See application file for complete search history.

(56) References Cited

U.S. PATENT DOCUMENTS

| | | | | |
|---|---|---|---|---|
| 2010/0302610 | A1* | 12/2010 | Matsuoka | B41J 2/473 359/204.1 |
| 2012/0257166 | A1 | 10/2012 | Francis et al. | |
| 2013/0300999 | A1* | 11/2013 | DeJong | G02B 26/10 351/158 |
| 2018/0143446 | A1 | 5/2018 | Nakamura | |
| 2019/0278076 | A1* | 9/2019 | Chen | G02B 13/08 |
| 2019/0324265 | A1 | 10/2019 | Milanovic | |
| 2020/0174356 | A1 | 6/2020 | Roberts et al. | |

OTHER PUBLICATIONS

Thorlabs, Inc., "Importance of Beam Circularization", presentation downloaded from <<https://www.thorlabs.com/images/TabImages/Elliptical_Beam_Circularization_Lab_Fact.pdf>> on Sep. 23, 2020; 18 pages.

* cited by examiner

*Primary Examiner* — Michelle M Iacoletti
*Assistant Examiner* — Danell L Owens

(57) ABSTRACT

Display systems, such as near eye display systems or wearable heads up displays, may include a laser projection system having an optical engine and an optical scanner. Light output by the optical engine may be directed into the optical scanner as two angularly separated laser light beams. The angularly separated laser light beams may overlap at an entrance pupil plane along a first dimension at a first scan mirror of the optical scanner, or at a location between the first scan mirror and an optical relay of the optical scanner. The angularly separated laser light beams may overlap at an exit pupil plane along the first dimension at a second scan mirror of the optical scanner or at an incoupler of the laser projection system.

21 Claims, 9 Drawing Sheets

DISPLAY SYSTEM WITH ANGULARLY SEPARATED LASERS

BACKGROUND

Some display systems employ a projector, which is an optical device that projects or shines a pattern of light onto another object (e.g., onto a surface of another object, such as onto a projection screen) in order to display an image or video on or via that other object. In projectors employing lasers as light sources (that is, in a "laser projector"), each beam of laser light generated by the laser projector is temporally modulated to provide a pattern of laser light and controllable mirrors, such as digital micromirrors, are typically used to spatially distribute the modulated pattern of laser light over a two-dimensional area of another object. The spatial distribution of the modulated pattern of laser light produces an image at the other object.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
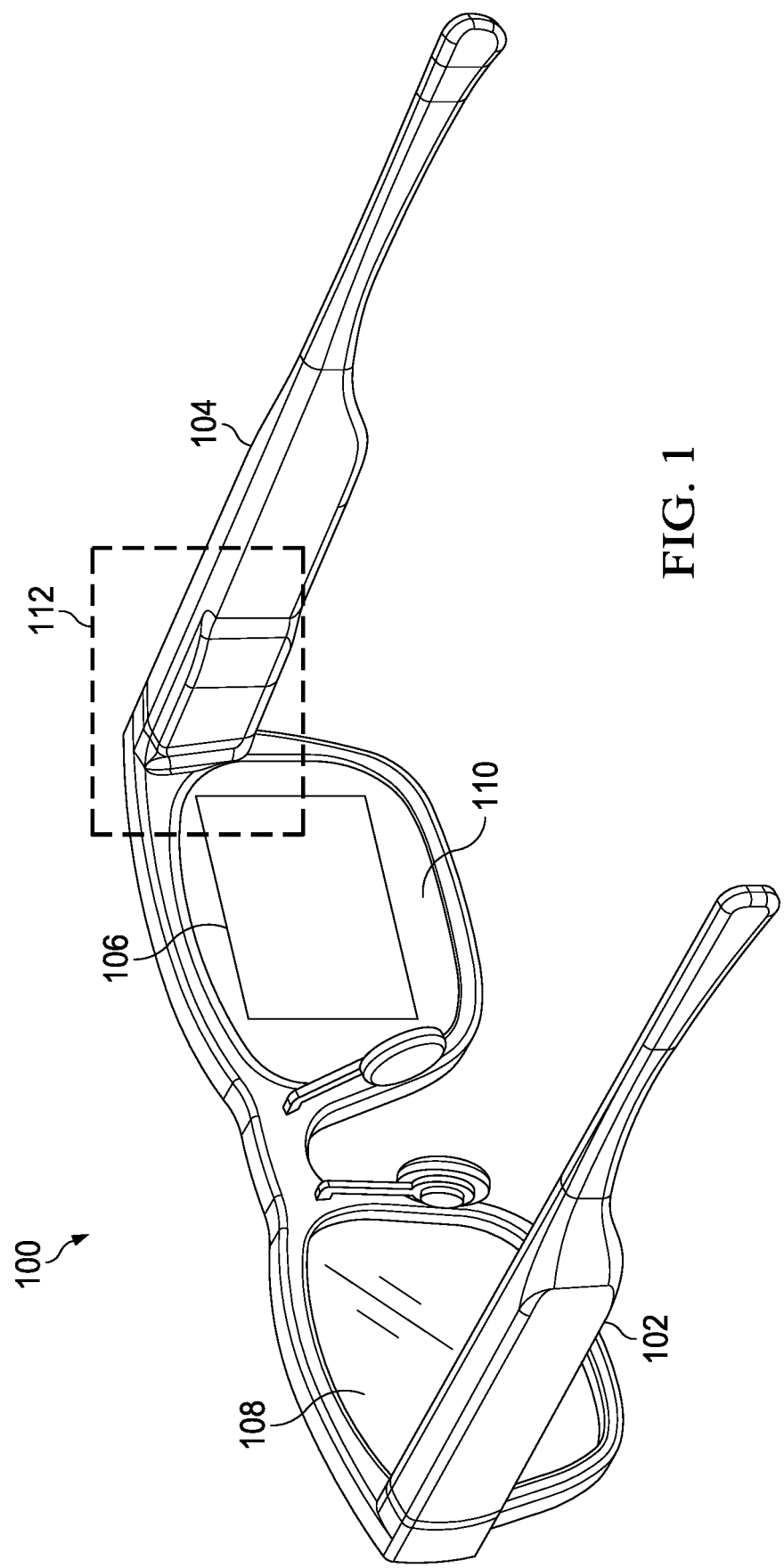
FIG. 1 is a diagram illustrating a display system having an integrated laser projection system, in accordance with some embodiments.

FIGS. 1-11 illustrate embodiments for compactly arranging a near-eye display system (e.g., a wearable heads-up display (WHUD)) or another display system. Using the techniques described herein, two or more laser inputs (e.g., laser light beams) of a laser projection system of such a display system are angularly separated with respect to one another. Herein, the term "angularly separated" laser light beams refers to two or more laser light beams that propagate along optical paths that are not parallel or perpendicular, but are instead tilted (e.g., angularly offset) with respect to one another. In some instances, angularly separated laser light beams converge along one or more dimensions, due to the angular separation of their respective optical paths, to overlap one another. A location at which such an overlap occurs may correspond to a "pupil plane", such as an entrance pupil plane or an exit pupil plane of an optical system. In some embodiments, an optical engine of the laser projection system generates two or more angularly separated light beams having an angular separation that causes the angularly separated laser light beams to converge to one or more pupil planes at one or more MEMS mirrors of the laser projection system or at an intermediate location between one of the MEMS mirrors and an optical relay of the laser projection system. Such placement of pupil planes of angularly separated laser light beams in a laser projection system may advantageously reduce the form factor of the laser projection system, improve the image quality of the laser projection system, or both, allowing the laser projection system to be used in display systems with a wider variety of form factors.

In some embodiments, the display system includes a laser projection system that includes an optical engine having at least two modulatable laser light sources, two scan mirrors, an optical relay, and a waveguide. In operation, the at least two modulatable laser light sources provide laser light (output as two or more angularly separated laser light beams), the two scan mirrors receive the laser light in series, and each scan the laser light over a respective direction (e.g., a first scan mirror may scan the light along a first dimension and a second scan mirror may scan the light along a second dimension, where the second dimension is substantially perpendicular to the first dimension in some embodiments). The waveguide includes an incoupler at which it receives the scanned laser light from the second scan mirror. The incoupler redirects received light through the waveguide, in some instances via an intervening exit pupil expander (EPE) toward an outcoupler of the waveguide so that the light is projected out of the waveguide (e.g., onto the eye of a user).

In some embodiments of such display systems, two angularly separated laser light beams are output (e.g., via the optical engine and a beam combiner) to an optical scanner that includes the first and second scan mirrors and the optical relay. The display system is arranged such that the two angularly separated laser light beams overlap at a first entrance pupil plane of the optical relay along an x-y dimension, a second entrance pupil plane along a second entrance pupil plane of the optical relay along an x-z dimension, a first exit pupil plane of the optical relay along the x-y dimension, and a second exit pupil plane of the optical relay along the x-z dimension. In some embodiments, the first entrance pupil plane and the second entrance pupil plane occur at the same location along the optical paths of the first and second angularly separated laser light beams, meaning that the two angularly separated laser light beams intersect at the first and second entrance pupil planes. In some embodiments, the first exit pupil plane and the second exit pupil plane occur at the same location along the optical paths of the first and second angularly separated laser light beams, meaning that the two angularly separated laser light beams intersect at the first and second exit pupil planes. In some embodiments, the first entrance pupil plane is disposed at a different location along the optical paths of the first and second angularly separated laser light beams from that of the second entrance pupil plane. In some embodiments, the first exit pupil plane is disposed at a different location along the optical paths of the first and second angularly separated laser light beams from that of the second exit pupil plane. In some embodiments, the first entrance pupil plane is coincident with the first scan mirror and the second entrance pupil plane is coincident with the incoupler. In some embodiments, the first entrance pupil is coincident with the first scan mirror and the second entrance pupil plane is coincident with the second scan mirror. In some embodiments, the first entrance pupil plane is disposed along the optical paths of the first and second angularly separated laser light beams at a location between the first scan mirror and the optical relay, and the first exit pupil plane is coincident with the second scan mirror. It should be understood that, herein, any of the entrance pupil planes or exit pupil planes of the optical relay may be located outside of the structure(s) of the optical relay itself but are still respectively considered entrance pupil planes and exit pupil planes of the optical relay.

By placing the first exit pupil plane at the second scan mirror instead of at the incoupler, the size of the second scan mirror can be reduced, since it does not need to accommodate the first and second angularly separated laser light beams at two different locations on its surface that are separated at least along the x-y dimension.

By placing the first entrance pupil plane between the first scan mirror and the optical relay, rather than directly on the first scan mirror, the likelihood of optical aberrations occurring due to dust or imperfections in the reflective surface of the first scan mirror is reduced, thereby comparatively improving the image quality provided by the optical scanner.

It should be noted that, although some embodiments of the present disclosure are described and illustrated with reference to a particular example near-eye display system in the form of a wearable-heads-up display (WHUD), it will be appreciated that the apparatuses and techniques of the present disclosure are not limited to this particular example, but instead may be implemented in any of a variety of display systems using the guidelines provided herein.

FIG. 1 illustrates an example display system 100 employing a scanning-based optical system in accordance with some embodiments having support structure 102 that includes an arm 104, which houses a laser projection system configured to project images toward the eye of a user, such that the user perceives the projected images as being displayed in a field of view (FOV) area 106 of a display at one or both of lens elements 108, 110. In the depicted embodiment, the display system 100 is a near-eye display system in the form of a WHUD in which the support structure 102 is configured to be worn on the head of a user and has a general shape and appearance (that is, form factor) of an eyeglasses (e.g., sunglasses) frame. The support structure 102 contains or otherwise includes various components to facilitate the projection of such images toward the eye of the user, such as a laser projector, an optical scanner, and a waveguide. In some embodiments, the support structure 102 further includes various sensors, such as one or more front-facing cameras, rear-facing cameras, other light sensors, motion sensors, accelerometers, and the like. The support structure 102 further can include one or more radio frequency (RF) interfaces or other wireless interfaces, such as a Bluetooth™ interface, a WiFi interface, and the like. Further, in some embodiments, the support structure 102 further includes one or more batteries or other portable power sources for supplying power to the electrical components of the display system 100. In some embodiments, some or all of these components of the display system 100 are fully or partially contained within an inner volume of support structure 102, such as within the arm 104 in region 112 of the support structure 102. It should be noted that while an example form factor is depicted, it will be appreciated that in other embodiments the display system 100 may have a different shape and appearance from the eyeglasses frame depicted in FIG. 1. It should be understood that instances of the term "or" herein refer to the non-exclusive definition of "or", unless noted otherwise. For example, herein the phrase "X or Y" means "either X, or Y, or both".

One or both of the lens elements 108, 110 are used by the display system 100 to provide an augmented reality (AR) display in which rendered graphical content can be superimposed over or otherwise provided in conjunction with a real-world view as perceived by the user through the lens elements 108, 110. For example, laser light used to form a perceptible image or series of images may be projected by a laser projector of the display system 100 onto the eye of the user via a series of optical elements, such as a waveguide formed at least partially in the corresponding lens element, one or more scan mirrors, and one or more optical relays. One or both of the lens elements 108, 110 thus include at least a portion of a waveguide that routes display light received by an incoupler of the waveguide to an outcoupler of the waveguide, which outputs the display light toward an eye of a user of the display system 100. The display light is modulated and scanned onto the eye of the user such that the user perceives the display light as an image. In addition, each of the lens elements 108, 110 is sufficiently transparent to allow a user to see through the lens elements to provide a field of view of the user's real-world environment such that the image appears superimposed over at least a portion of the real-world environment.

In some embodiments, the projector is a digital light processing-based projector, a scanning laser projector, or any combination of a modulative light source such as a laser or one or more light-emitting diodes (LEDs) and a dynamic reflector mechanism such as one or more dynamic scanners or digital light processors. In some embodiments, the projector includes multiple laser diodes (e.g., a red laser diode, a green laser diode, and a blue laser diode) and at least one scan mirror (e.g., two one-dimensional scan mirrors, which may be micro-electromechanical system (MEMS)-based or piezo-based). The projector is communicatively coupled to the controller and a non-transitory processor-readable storage medium or memory storing processor-executable instructions and other data that, when executed by the controller, cause the controller to control the operation of the projector. In some embodiments, the controller controls a scan area size and scan area location for the projector and is communicatively coupled to a processor (not shown) that generates content to be displayed at the display system 100. The projector scans light over a variable area, designated the FOV area 106, of the display system 100. The scan area size corresponds to the size of the FOV area 106 and the scan area location corresponds to a region of one of the lens elements 108, 110 at which the FOV area 106 is visible to the user. Generally, it is desirable for a display to have a wide FOV to accommodate the outcoupling of light across a wide range of angles. Herein, the range of different user eye positions that will be able to see the display is referred to as the eyebox of the display.

In some embodiments, the projector routes light via first and second scan mirrors, an optical relay disposed between the first and second scan mirrors, and a waveguide disposed at the output of the second scan mirror. In some embodiments, at least a portion of an outcoupler of the waveguide may overlap the FOV area 106. These aspects are described in greater detail below.

Figure 2:
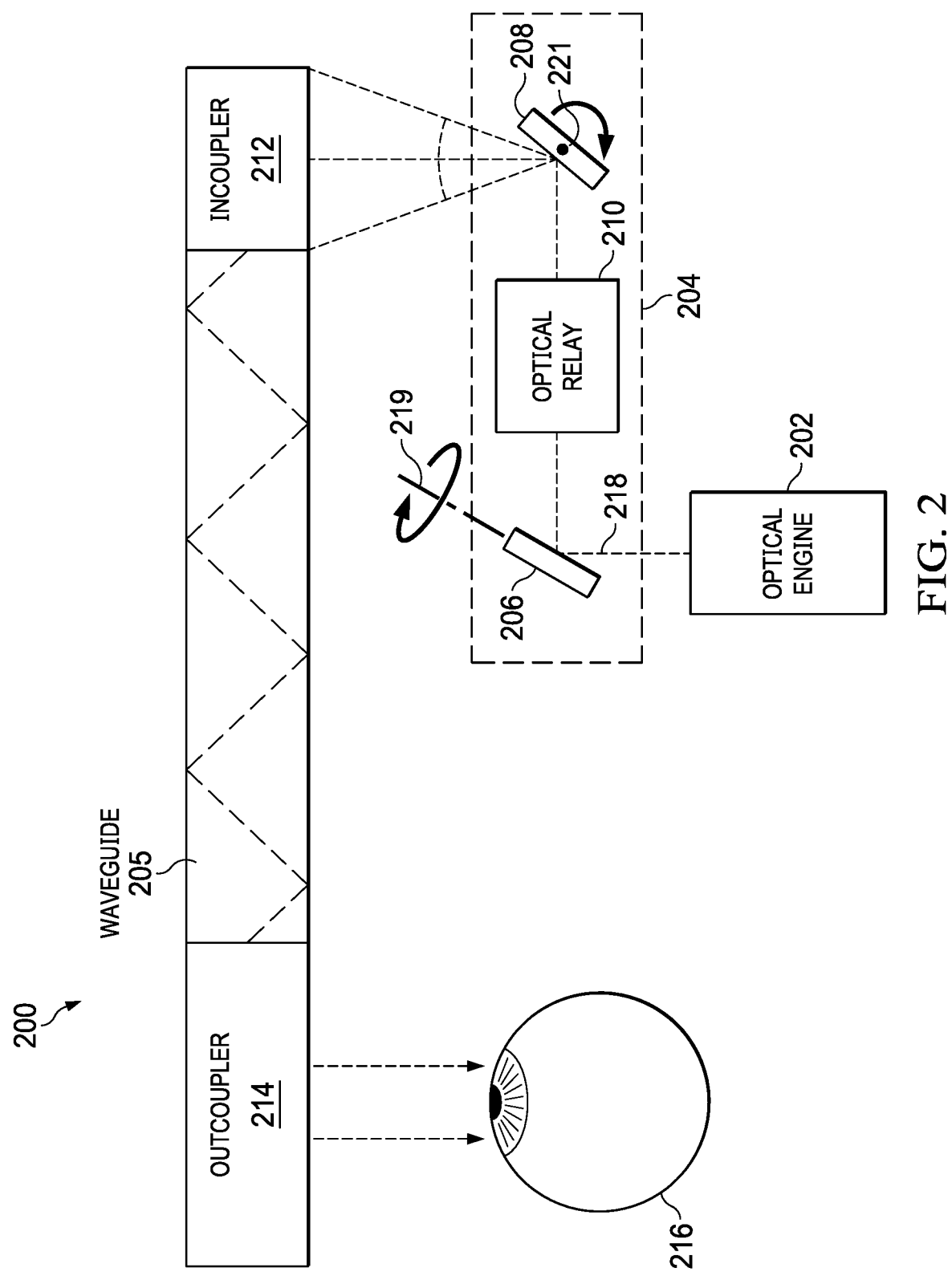
FIG. 2 is a diagram illustrating a laser projection system having an optical scanner that includes an optical relay disposed between two scan mirrors, in accordance with some embodiments.

FIG. 2 illustrates a simplified block diagram of a laser projection system 200 that projects images directly onto the eye of a user via laser light. The laser projection system 200 includes an optical engine 202, an optical scanner 204, and a waveguide 205. The optical scanner 204 includes a first scan mirror 206, a second scan mirror 208, and an optical relay 210. The waveguide 205 includes an incoupler 212 and an outcoupler 214, with the outcoupler 214 being optically aligned with an eye 216 of a user in the present example. In some embodiments, the laser projection system 200 is implemented in a wearable heads-up display or another display system, such as the display system 100 of FIG. 1.

The optical engine 202 includes one or more laser light sources configured to generate and output laser light 218 (e.g., visible laser light such as red, blue, and green laser light and, in some embodiments, non-visible laser light such as infrared laser light). In some embodiments, the optical engine 202 is coupled to a driver or other controller (not shown), which controls the timing of emission of laser light from the laser light sources of the optical engine 202 in accordance with instructions received by the controller or driver from a computer processor coupled thereto to modulate the laser light 218 to be perceived as images when output to the retina of an eye 216 of a user.

For example, during operation of the laser projection system 200, multiple laser light beams having respectively different wavelengths are output by the laser light sources of the optical engine 202, then combined via a beam combiner (not shown), before being directed to the eye 216 of the user. The optical engine 202 modulates the respective intensities of the laser light beams so that the combined laser light reflects a series of pixels of an image, with the particular intensity of each laser light beam at any given point in time contributing to the amount of corresponding color content and brightness in the pixel being represented by the combined laser light at that time.

One or both of the first and second scan mirrors 206 and 208 of the optical scanner 204 are MEMS mirrors in some embodiments. For example, the first scan mirror 206 and the second scan mirror 208 are MEMS mirrors that are driven by respective actuation voltages to oscillate during active operation of the laser projection system 200, causing the first and second scan mirrors 206 and 208 to scan the laser light 218. Oscillation of the first scan mirror 206 causes laser light 218 output by the optical engine 202 to be scanned through the optical relay 210 and across a surface of the second scan mirror 208. The second scan mirror 208 scans the laser light 218 received from the first scan mirror 206 toward an incoupler 212 of the waveguide 205. In some embodiments, the first scan mirror 206 oscillates or otherwise rotates around a first axis 219, such that the laser light 218 is scanned in only one dimension (i.e., in a line) across the surface of the second scan mirror 208. In some embodiments, the second scan mirror 208 oscillates or otherwise rotates around a second axis 221. In some embodiments, the first axis 219 is skew with respect to the second axis 221.

In some embodiments, the incoupler 212 has a substantially rectangular profile and is configured to receive the laser light 218 and direct the laser light 218 into the waveguide 205. The incoupler 212 is defined by a smaller dimension (i.e., width) and a larger orthogonal dimension (i.e., length). In an embodiment, the optical relay 210 is a line-scan optical relay that receives the laser light 218 scanned in a first dimension by the first scan mirror 206 (e.g., the first dimension corresponding to the small dimension of the incoupler 212), routes the laser light 218 to the second scan mirror 208, and introduces a convergence to the laser light 218 (e.g., via collimation) in the first dimension to an exit pupil plane of the optical relay 210 beyond the second scan mirror 208. Herein, a "pupil plane" refers to a location along the optical path of laser light through an optical system where the laser light converges to an aperture along one or more dimensions. For example, the optical relay 210 may be associated with one or more entrance pupil planes located along the optical path of laser light through the optical system where the laser light converges to a virtual aperture before entering the optical relay 210. For example, the optical relay 210 may be associated with one or more exit pupil planes located along the optical path of laser light through the optical system where the laser light converges to a virtual aperture along one or more dimensions after exiting the optical relay 210. In some embodiments, an entrance pupil plane of the optical relay 210 may be located coincident with the first scan mirror 206. In some embodiments, an entrance pupil plane of the optical relay 210 may be located at an intermediate location between the first scan mirror 206 and the optical relay 210. In some embodiments, an exit pupil plane of the optical relay 210 may be located coincident with the second scan mirror 208. In some embodiments, an exit pupil plane of the optical relay 210 may be located coincident with the incoupler 212.

In some instances, the laser light converges to a virtual aperture of a first entrance pupil plane along a first dimension (e.g., with the laser light converging along the x-y dimension to a point or line along a z dimension with respect to a cartesian coordinate system having x-, y-, and z-axes) and converges to a virtual aperture of a second entrance pupil plane along a second dimension (e.g., the second dimension being substantially perpendicular to the first dimension), where the first and second entrance pupil planes differ with respect to location. In some instances, the laser light converges to a virtual aperture of a first exit pupil plane along a first dimension (e.g., with the laser light converging along the x-y dimension to a point or line along a z dimension with respect to a cartesian coordinate system having x-, y-, and z-axes) and converges to a virtual aperture of an exit entrance pupil plane along a second dimension (e.g., the second dimension being substantially perpendicular to the first dimension), where the first and second exit pupil planes differ with respect to location. In other instances, the laser light converges to a virtual aperture of a single entrance pupil plane along all dimensions (e.g., with the laser light converging to the virtual aperture along each of the x, y, and z dimensions) and converges to a virtual aperture of a single exit pupil plane along all dimensions. While, in the present example, the optical engine 202 is shown to output a single beam of laser light 218 (which itself may be a combination of two or more beams of light having respectively different polarizations or wavelengths) toward the first scan mirror, in some embodiments, the optical engine 202 is configured to generate and output two or more laser light beams toward the first scan mirror, where the two or more laser light beams are angularly separated with respect to one another (i.e., they are "angularly separated laser light beams"). As described previously, two or more laser light beams are "angularly separated" when propagate along respectively different non-parallel and non-perpendicular optical paths that are tilted (e.g., angularly offset) with respect to one another, with the angular separation of the optical paths, in some instances, causing the two or more laser light beams to converge to overlap one another along one or more dimensions (e.g., such overlap corresponding to a virtual aperture of a pupil plane).

In the present example, the possible optical paths of the laser light 218, following reflection by the first scan mirror 206, are initially spread along a first scanning dimension, but later these paths intersect at an exit pupil plane beyond the second scan mirror 208 due to convergence introduced by the optical relay 210. For example, the width (i.e., smallest dimension) of a given exit pupil plane approximately corresponds to the diameter of the laser light corresponding to that exit pupil plane. Accordingly, the exit pupil plane can be considered a "virtual aperture". In some embodiments, the exit pupil plane of the optical relay 210 is coincident with the incoupler 212. In some embodiments, an entrance pupil plane of the optical relay 210 is coincident with the first scan mirror 206.

According to various embodiments, the optical relay 210 includes one or more spherical, aspheric, parabolic, or freeform lenses that shape and relay the laser light 218 on the second scan mirror 208 or includes a molded reflective relay that includes two or more optical surfaces that include, but are not limited to, spherical, aspheric, parabolic, or freeform lenses or reflectors (sometimes referred to as "reflective surfaces" herein), which shape and direct the laser light 218 onto the second scan mirror 208. The second scan mirror 208 receives the laser light 218 and scans the laser light 218 in a second dimension, the second dimension corresponding to the long dimension of the incoupler 212 of the waveguide 205. In some embodiments, the second scan mirror 208 causes the exit pupil plane of the laser light 218 to be swept along a line along the second dimension. In some embodiments, the incoupler 212 is positioned at or near the swept line downstream from the second scan mirror 208 such that the second scan mirror 208 scans the laser light 218 as a line or row over the incoupler 212.

In some embodiments, the optical engine 202 includes an edge-emitting laser (EEL) that emits a laser light 218 having a substantially elliptical, non-circular cross-section, and the optical relay 210 magnifies or minimizes the laser light 218 along one or both of a first direction (e.g., the semi-major axis of the beam profile of the laser light 218) or a second direction (e.g., the semi-minor axis of the beam profile of the laser light 218) to reshape (e.g., circularize) the laser light 218 prior to the convergence of the laser light 218 on the second scan mirror 208. In some such embodiments, a surface of a mirror plate of the first scan mirror 206 is elliptical and non-circular (e.g., similar in shape and size to the cross-sectional area of the laser light 218). In other such embodiments, the surface of the mirror plate of the first scan mirror 206 is circular.

The waveguide 205 of the laser projection system 200 includes the incoupler 212 and the outcoupler 214. The term "waveguide," as used herein, will be understood to mean a combiner using one or more of total internal reflection (TIR), specialized filters, or reflective surfaces, to transfer light from an incoupler (such as the incoupler 212) to an outcoupler (such as the outcoupler 214). In some display applications, the light is a collimated image, and the waveguide transfers and replicates the collimated image to the eye. In general, the terms "incoupler" and "outcoupler" will be understood to refer to any type of optical grating structure, including, but not limited to, diffraction gratings, holograms, holographic optical elements (e.g., optical elements using one or more holograms), volume diffraction gratings, volume holograms, surface relief diffraction gratings, or surface relief holograms. In some embodiments, a given incoupler or outcoupler is configured as a transmissive grating (e.g., a transmissive diffraction grating or a transmissive holographic grating) that causes the incoupler or outcoupler to transmit light and to apply designed optical function(s) to the light during the transmission. In some embodiments, a given incoupler or outcoupler is a reflective grating (e.g., a reflective diffraction grating or a reflective holographic grating) that causes the incoupler or outcoupler to reflect light and to apply designed optical function(s) to the light during the reflection. In the present example, the laser light 218 received at the incoupler 212 is relayed to the outcoupler 214 via the waveguide 205 using TIR. The laser light 218 is then output to the eye 216 of a user via the outcoupler 214. As described above, in some embodiments the waveguide 205 is implemented as part of an eyeglass lens, such as the lens 108 or lens 110 (FIG. 1) of the display system having an eyeglass form factor and employing the laser projection system 200.

Although not shown in the example of FIG. 2, in some embodiments additional optical components are included in any of the optical paths between the optical engine 202 and the first scan mirror 206, between the first scan mirror 206 and the optical relay 210, between the optical relay 210 and the second scan mirror 208, between the second scan mirror 208 and the incoupler 212, between the incoupler 212 and the outcoupler 214, or between the outcoupler 214 and the eye 216 (e.g., in order to shape the laser light for viewing by the eye 216 of the user). In some embodiments, a prism is used to steer light from the second scan mirror 208 into the incoupler 212 so that light is coupled into incoupler 212 at the appropriate angle to encourage propagation of the light in waveguide 205 by TIR. Also, in some embodiments, an exit pupil expander (e.g., an exit pupil expander 304 of FIG. 3, described below), such as a fold grating, is arranged in an intermediate stage between incoupler 212 and outcoupler 214 to receive light that is coupled into waveguide 205 by the incoupler 212, expand the light, and redirect the light towards the outcoupler 214, where the outcoupler 214 then couples the laser light out of waveguide 205 (e.g., toward the eye 216 of the user).

Figure 3:
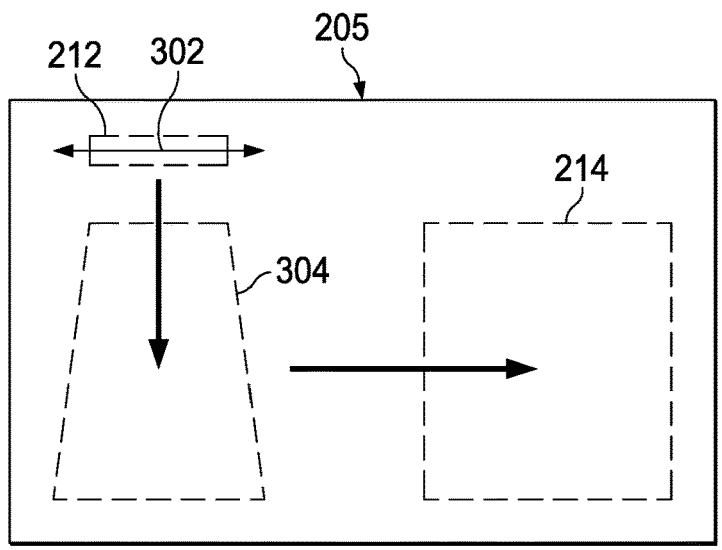
FIG. 3 is a diagram illustrating a waveguide having an incoupler, outcoupler, and exit pupil expander, in accordance with some embodiments.

FIG. 3 shows an example of light propagation within the waveguide 205 of the laser projection system 200 of FIG. 2 in accordance with some embodiments. As shown, light received via the incoupler 212, which is scanned along the scanning dimension 302, is directed into an exit pupil expander 304 and is then routed to the outcoupler 214 to be output (e.g., toward the eye of the user). In some embodiments, the exit pupil expander 304 expands one or more dimensions of the eyebox of a display system (e.g., the display system 100 of FIG. 1; the WHUD 600, 702 of FIGS. 6 and 7) that includes the laser projection system 200 (e.g., with respect to what the dimensions of the eyebox of the display would be without the exit pupil expander 304). In some embodiments, the incoupler 212 and the exit pupil expander 304 each include respective one-dimensional diffraction gratings (i.e., diffraction gratings that extend along one dimension), which diffract incident light in a particular direction depending on the angle of incidence of the incident light and the structural aspects of the diffraction gratings. It should be understood that FIG. 3 shows a substantially ideal case in which the incoupler 212 directs light straight down (with respect to the presently illustrated view) in a first direction that is perpendicular to the scanning dimension 302, and the exit pupil expander 304 directs light to the right (with respect to the presently illustrated view) in a second direction that is perpendicular to the first direction. While not shown in the present example, it should be understood that, in some embodiments, the first direction in which the incoupler 212 directs light is slightly or substantially diagonal, rather than exactly perpendicular, with respect to the scanning dimension 302.

Figure 4:
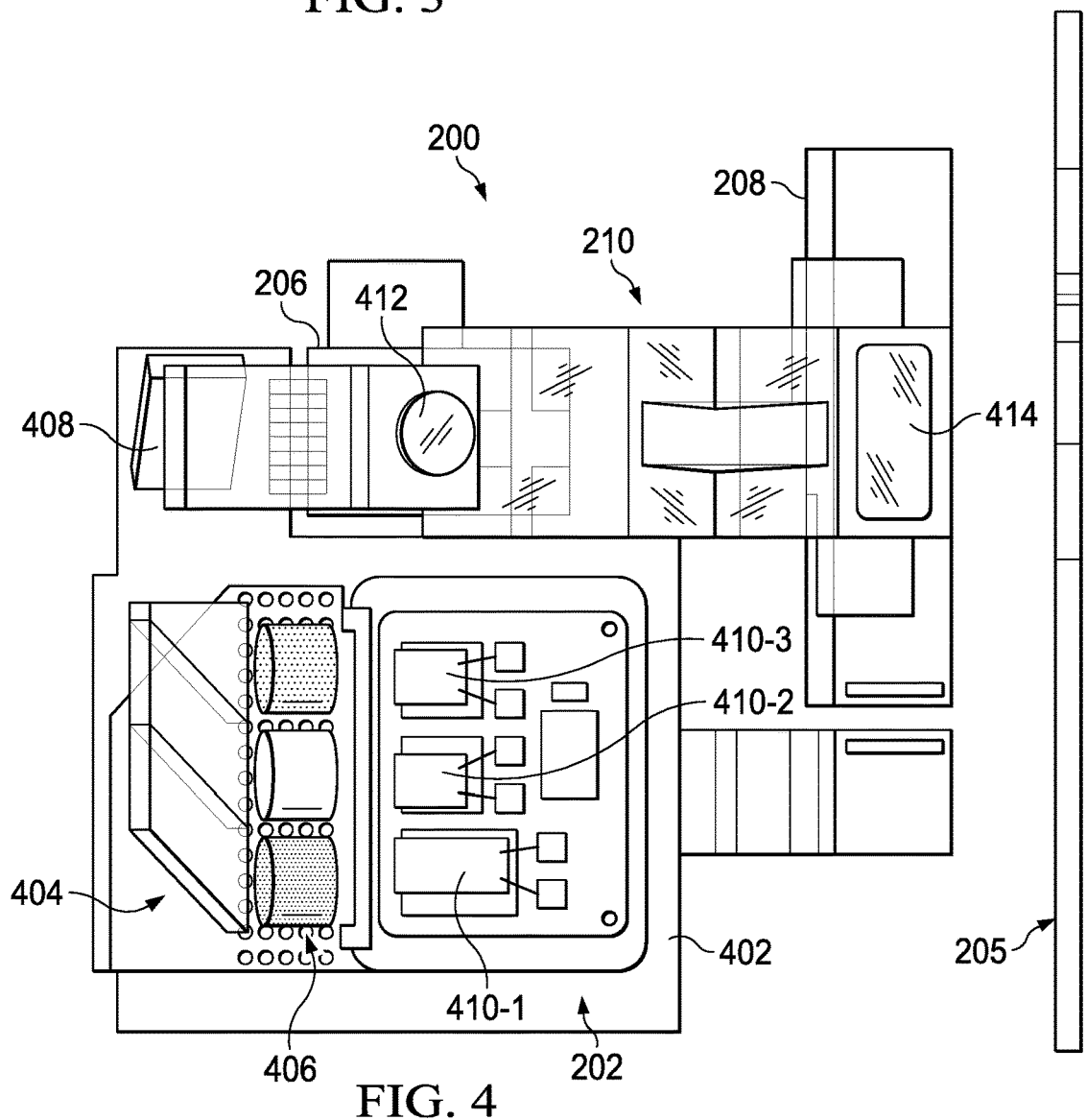
FIG. 4 is a diagram illustrating a laser projection system that includes a molded reflective relay disposed between two scan mirrors, in accordance with some embodiments.

FIG. 4 shows an example embodiment of the laser projection system 200 in which the optical relay 210 includes a molded reflective relay. As shown, the laser projection system 200 includes a substrate 402 on which a beam combiner 404, primary lenses 406, and a mirror 408 are disposed. According to various embodiments, the substrate 402 is a printed circuit board (PCB) or otherwise another applicable substrate.

The optical engine 202 comprises a set of one or more laser light sources 410 (e.g., laser diodes), such as the illustrated red laser light source 410-1, green laser light source 410-2, and blue laser light source 410-3, wherein a processor or other controller operates the optical engine 202 to modulate the respective intensity of each laser light source 410 so as to provide a corresponding red light, green light, and blue light contribution to a corresponding pixel of an image being generated for display to the user. The primary lenses 406 includes a corresponding number of collimation lenses (e.g., three for the three laser light sources 410 in the example above), each interposed in the light path between a respective laser light source 410 of the optical engine 202 and the beam combiner 404. For example, each laser light source 410 outputs a different wavelength of laser light (e.g., corresponding to respective red, blue, and green wavelengths) through the primary lenses 406 to be combined at the beam combiner 404 to produce the laser light (i.e., laser light 218 shown in FIG. 2) to be projected by the laser projection system 200. The beam combiner 404 receives the individual laser light inputs and outputs a combined laser light 218 to the mirror 408, which redirects the laser light 218 onto a reflective surface 412 of the first scan mirror 206. The first scan mirror 206 scans the laser light 218 into the optical relay 210 along a first scanning dimension.

In the example of FIG. 4, the optical relay 210 is a molded reflective relay, which may be, for example, molded from a solid clear component (e.g., glass or an optical plastic such as Zeonex) and the reflective surfaces thereof are implemented as mirror coatings or metasurfaces. In some embodiments, one or more reflective surfaces of the molded reflective relay 1802 reflect light via TIR and therefore do not require mirror coatings or fabricated metasurfaces to reflect light. Such molding can simplify the fabrication of the laser projection system 200 as it facilitates the incorporation of some or all of the optical surfaces of the relay into a single element, rather than several distinct, separate elements. Further, in some embodiments, the use of a molded structure allows for light to be propagated through one or more regions of the molded reflective relay 1802 via TIR, rather using mirror coatings to propagate light through those regions.

The optical relay 210 is configured to route the laser light 218 toward a reflective surface 414 of the second scan mirror 208. The second scan mirror 208 scans the laser light 218 across the incoupler (such as the incoupler 212) of the waveguide 205 along a second scanning dimension. In some embodiments, the second scanning dimension is perpendicular to the plane along which the laser light propagates through the optical relay 210.

Figure 5:
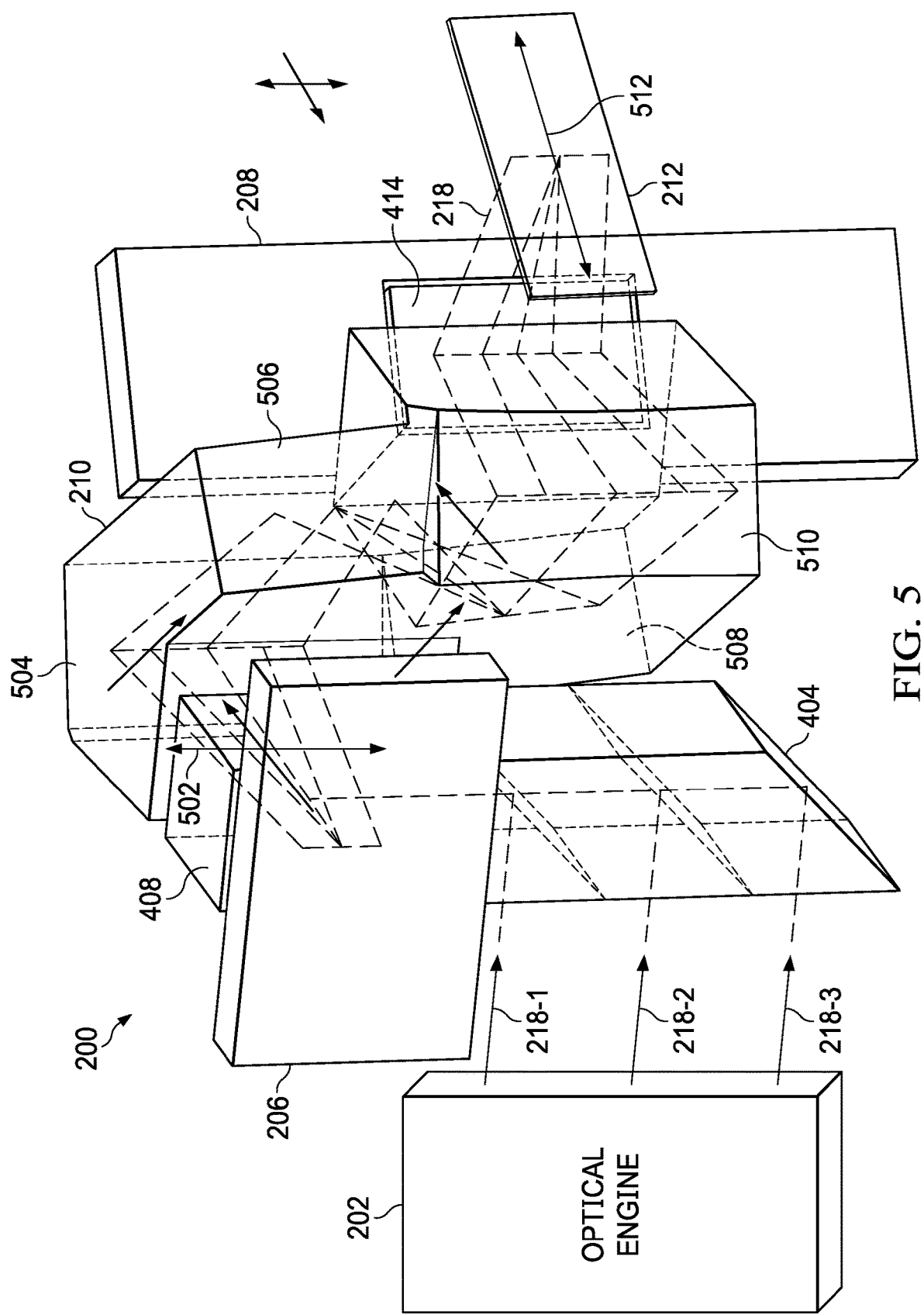
FIG. 5 is a diagram illustrating a laser projection system that includes a molded reflective relay disposed between two scan mirrors, and illustrating optical paths through the molded reflective relay, in accordance with some embodiments.

FIG. 5 shows an example of paths that the concurrent laser lights output by the optical engine 202 can take through the optical relay 210 for an embodiment in which the optical relay 210 is a molded reflective relay. As shown, the optical engine 202 outputs red laser light 218-1, green laser light 218-2, and blue laser light 218-3 toward the beam combiner 404. The beam combiner 404 combines individual beams of the laser light 218-1, 218-2, 218-3 into the laser light 218, and redirects the laser light 218 toward the mirror 408, which reflects the laser light 218 onto the first scan mirror 206. The first scan mirror 206 scans the laser light 218 along a first scanning dimension 502 into the optical relay 210. The optical relay 210 reflects the laser light 218 off of reflective surfaces 504, 506, 508, and 510, then outputs the laser light 218 toward the reflective surface 414 of the second scan mirror 208. The second scan mirror 208 then scans the laser light 218 across the incoupler 212 along a second scanning dimension 512, where the laser light 218 converges onto the incoupler 212 at most or all achievable scan angles of the first scan mirror 206. While, in the present example, the beam combiner 404 is shown to output a single beam of the laser light 218, it should be understood that, in some embodiments, the beam combiner 404 is configured to output two or more angularly separated laser light beams, which are directed onto the first scan mirror 206.

Figure 6:
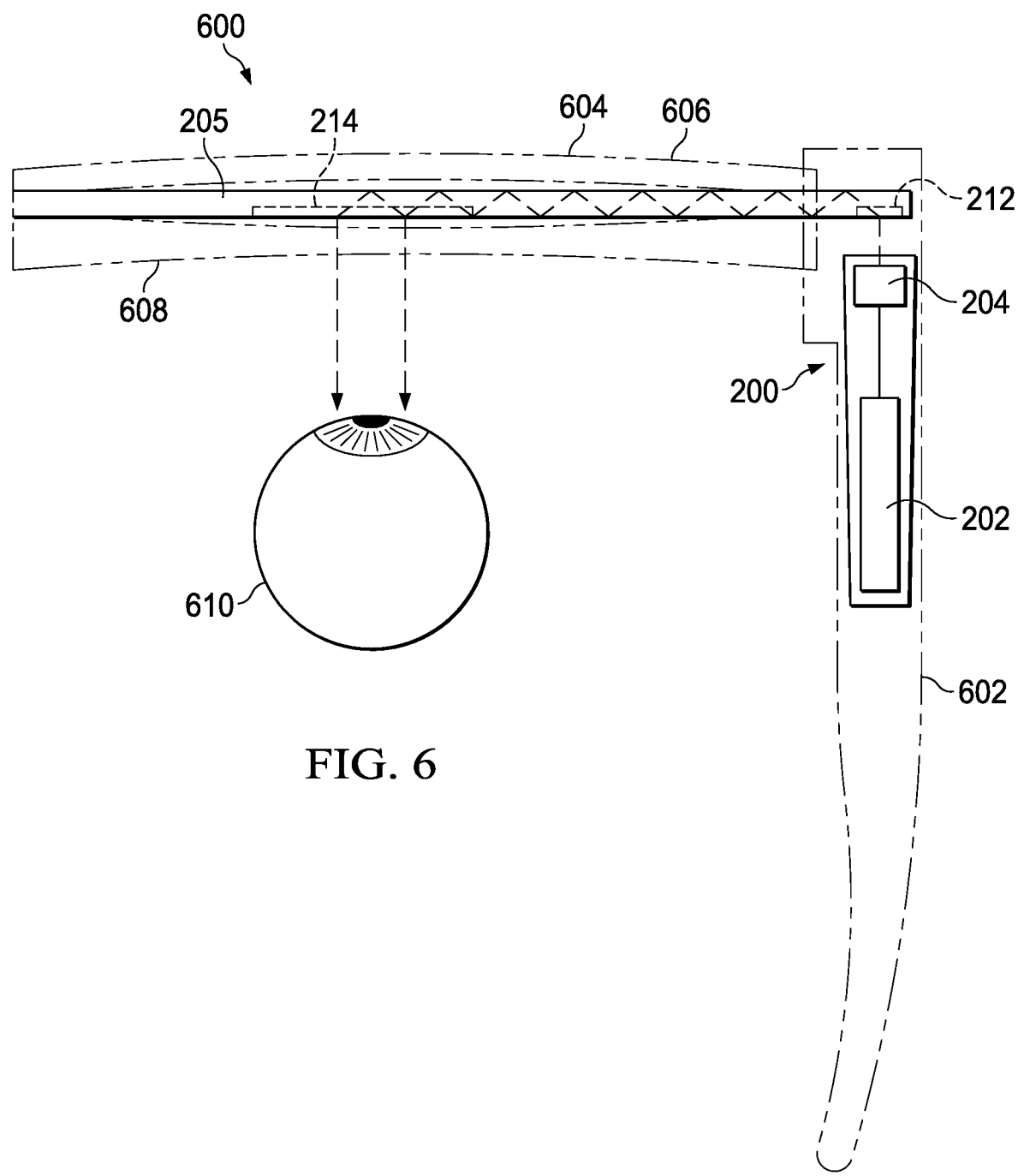
FIG. 6 is a diagram illustrating a partially transparent view of a wearable heads-up display (WHUD) that includes a laser projection system, in accordance with some embodiments.

FIG. 6 illustrates a portion of a WHUD 600 that includes the laser projection system 200 of FIG. 2. In some embodiments, the WHUD 600 represents the display system 100 of FIG. 1. The optical engine 202, the optical scanner 204, the incoupler 212, and a portion of the waveguide 205 are included in an arm 602 of the WHUD 600, in the present example.

The WHUD 600 includes an optical combiner lens 604, which includes a first lens 606, a second lens 608, and the waveguide 205, with the waveguide 205 disposed between the first lens 606 and the second lens 608. Light exiting through the outcoupler 214 travels through the second lens 608 (which corresponds to, for example, the lens element 110 of the display system 100). In use, the light exiting the second lens 608 enters the pupil of an eye 610 of a user wearing the WHUD 600, causing the user to perceive a displayed image carried by the laser light output by the optical engine 202. The optical combiner lens 604 is substantially transparent, such that light from real-world scenes corresponding to the environment around the WHUD 600 passes through the first lens 606, the second lens 608, and the waveguide 205 to the eye 610 of the user. In this way, images or other graphical content output by the laser projection system 200 are combined (e.g., overlayed) with real-world images of the user's environment when projected onto the eye 610 of the user to provide an AR experience to the user.

Although not shown in the depicted example, in some embodiments additional optical elements are included in any of the optical paths between the optical engine 202 and the incoupler 212, in between the incoupler 212 and the outcoupler 214, or in between the outcoupler 214 and the eye 610 of the user (e.g., in order to shape the laser light for viewing by the eye 610 of the user). As an example, a prism is used to steer light from the optical scanner 204 into the incoupler 212 so that light is coupled into incoupler 212 at the appropriate angle to encourage propagation of the light in waveguide 205 by TIR. Also, in some embodiments, an exit pupil expander (e.g., the exit pupil expander 304), such as a fold grating, is arranged in an intermediate stage between incoupler 212 and outcoupler 214 to receive light that is coupled into waveguide 205 by the incoupler 212, expand the light, and redirect the light towards the outcoupler 214, where the outcoupler 214 then couples the laser light out of waveguide 205 (e.g., toward the eye 610 of the user).

Figure 7:
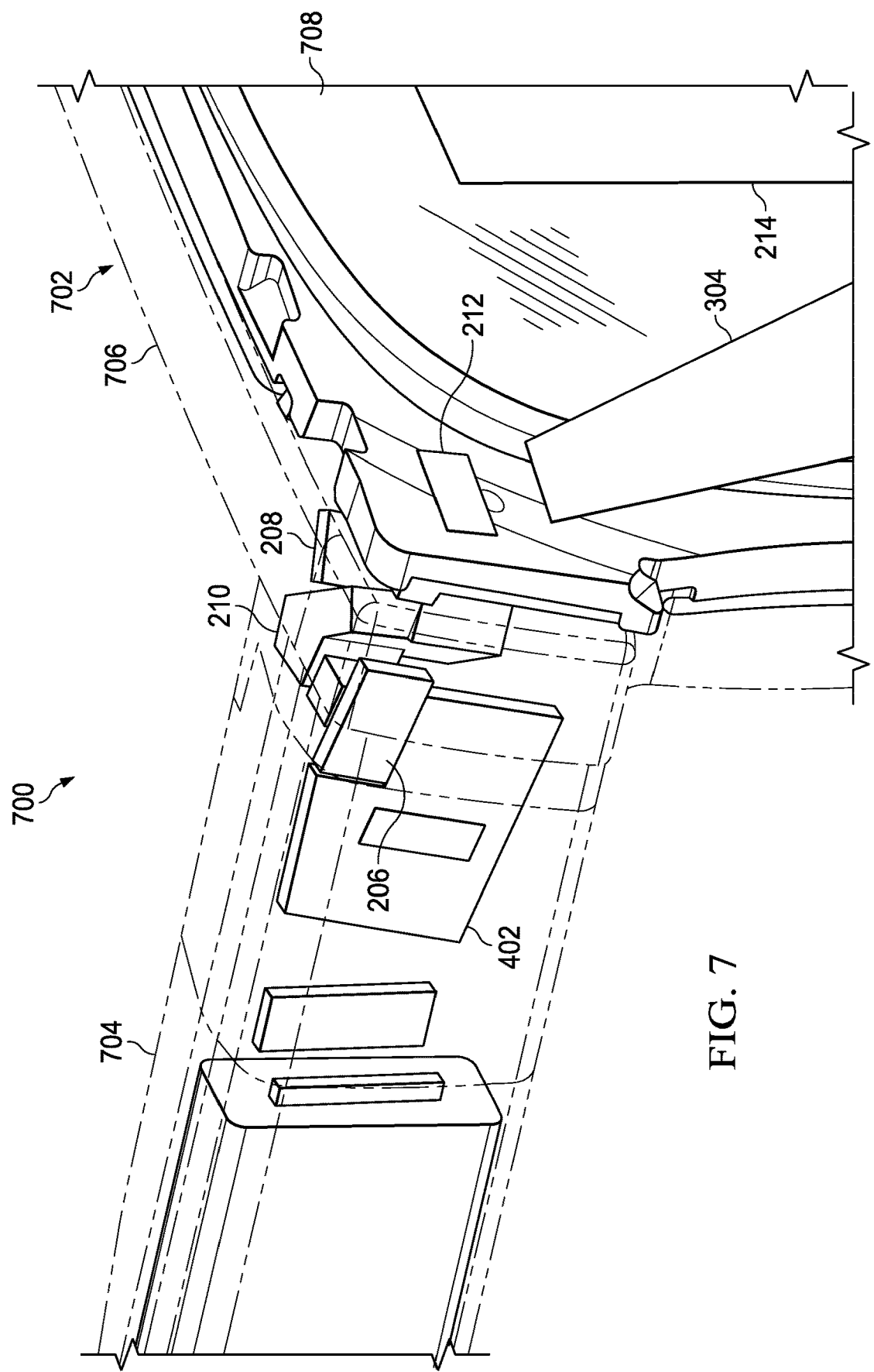
FIG. 7 is a diagram illustrating a partially transparent front isometric view of a laser projection system disposed within a WHUD, in accordance with some embodiments.
Figure 8:
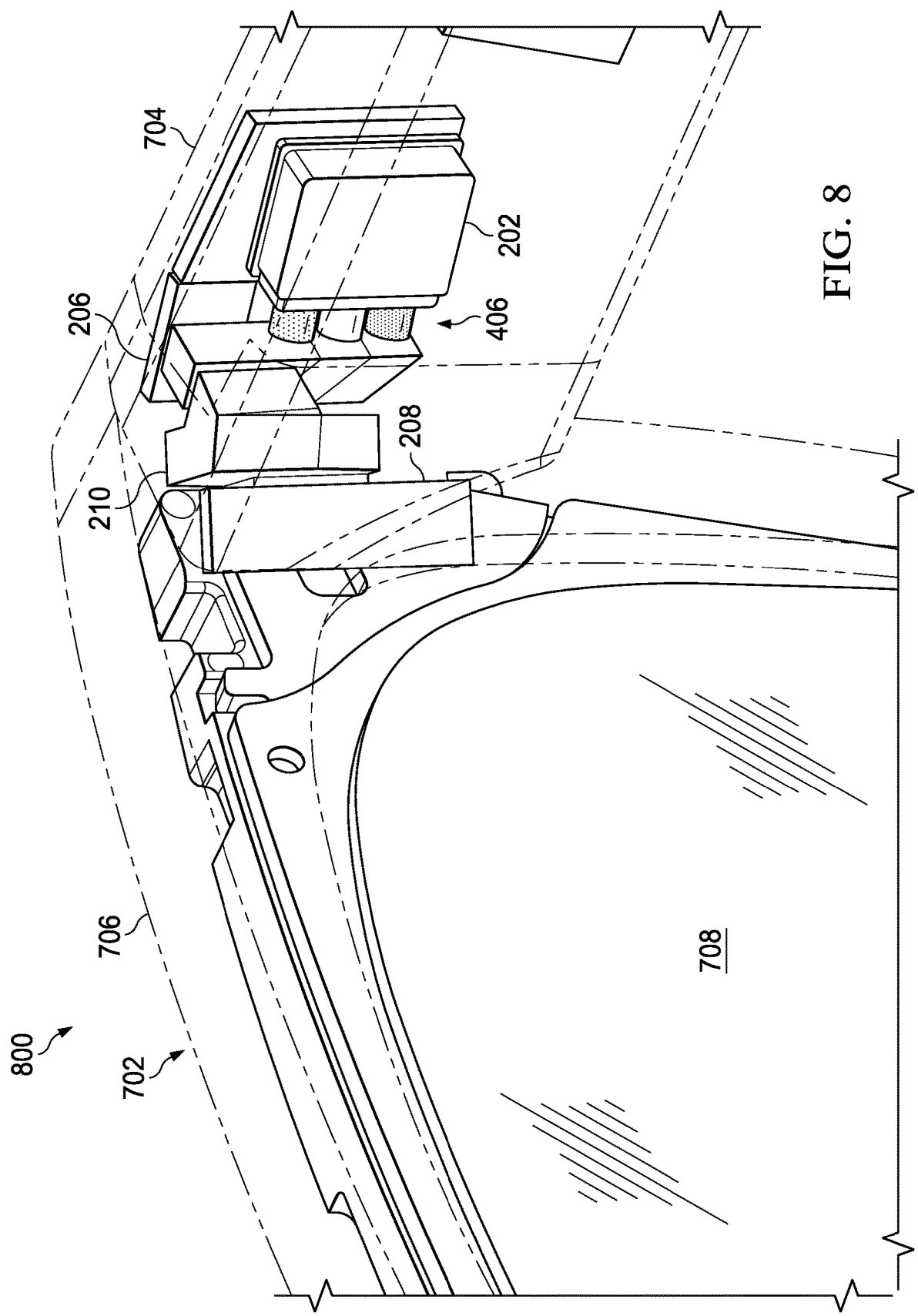
FIG. 8 is a diagram illustrating a partially transparent rear isometric view of a laser projection system disposed within a WHUD, in accordance with some embodiments.

FIGS. 7 and 8 show two different perspective, partially transparent views 700 (FIG. 7) and 800 (FIG. 8) of a portion of a WHUD 702, which represents the WHUD 600 of FIG. 6 or the display system 100 of FIG. 1. The WHUD 702 includes an example arrangement of the laser projection system 200 of FIGS. 2, 4, and 5 for an embodiment in which the optical relay 210 is a molded reflective relay. In some embodiments, the WHUD 702 corresponds to the display system 100 of FIG. 1, and the illustrated portion of the WHUD 702 corresponds to the region 112 of the display system 100.

As shown by the views 700 of FIG. 7 and 800 of FIG. 8, the arm 704 of the WHUD 702 houses the optical engine 202, the primary lenses 406 and at least a portion of the first scan mirror 206, the optical relay 210, and the substrate 402. A frame section 706 of the WHUD 702 houses the second scan mirror 208 and portions of the first scan mirror 206, the optical relay 210, and the substrate 402. As shown by the view 700 of FIG. 7, the incoupler 212 and the outcoupler 214 of the waveguide 205 (not fully shown in the views of FIGS. 7 and 8), are each embedded in or otherwise disposed on the lens 708 (one embodiment of, for example, lens 110 of FIG. 1). As described previously, laser light output by the optical engine 202 (e.g., laser light 218, FIG. 5) is routed to the incoupler 212 via at least the first scan mirror 206, the optical relay 210, and the second scan mirror 208. The first scan mirror 206 oscillates or otherwise rotates to scan the laser light along a first scanning dimension, and the second scan mirror 208 oscillates or otherwise rotates to scan the laser light along a second scanning dimension that is perpendicular to the first scanning dimension. Laser light reflected by the second scan mirror 208 converges to a line at the incoupler 212. Relayed laser light received by the incoupler 212 is routed to the outcoupler 214 via the waveguide 205. The laser light received at the outcoupler 214 is then directed out of the waveguide 205 (e.g., toward the eye of a user of the WHUD 702).

Figure 9:
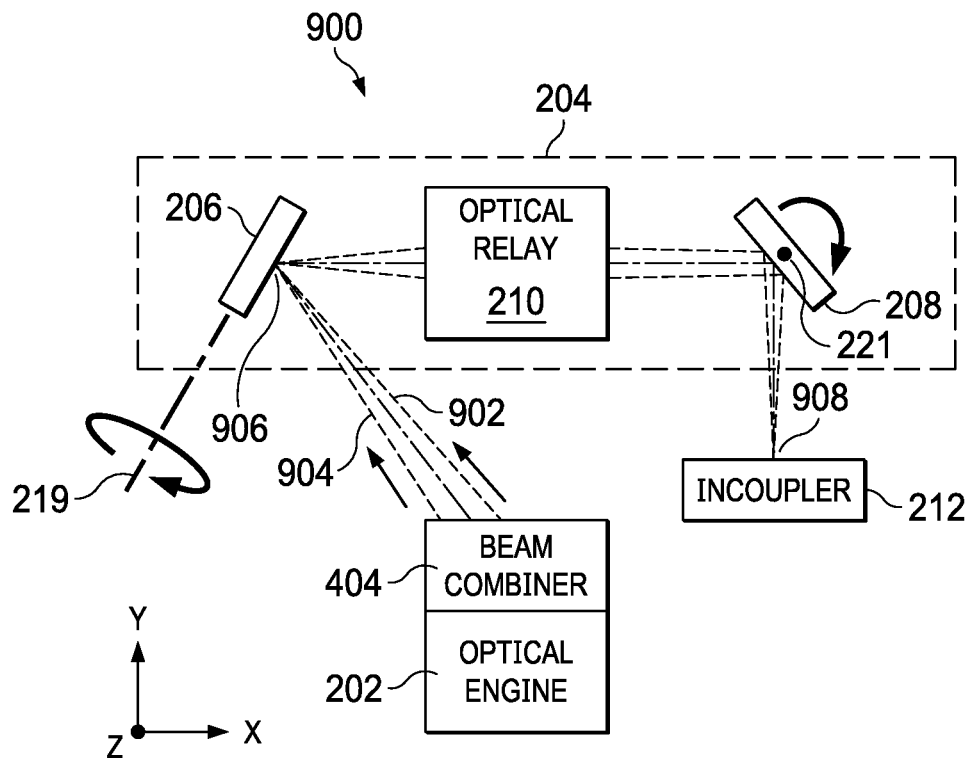
FIG. 9 is a diagram illustrating a top view of a portion of a laser projection system in which a pair of angularly separated lasers overlap at an entrance pupil plane at a first scan mirror and at an exit pupil plane at an incoupler, in accordance with some embodiments.

FIG. 9 shows an illustrative top-down view of a laser projection system 900 (one embodiment of the laser projection system 200 of FIG. 2), in which a first entrance pupil plane 906 of the optical relay 210 of the optical scanner 204 is incident with a reflective surface of the first scan mirror 206, and a first exit pupil plane 908 of the optical relay 210 is coincident with the incoupler 212. In the present example, the top-down view of the laser projection system 900 is provided with respect to a three-dimensional cartesian coordinate system having respectively orthogonal x-, y-, and z-axes, where the top-down view provides the perspective of looking down the positive z-axis.

The optical engine 202 includes two or more laser light sources, each configured to output a respectively different wavelength of laser light toward the beam combiner 404. The beam combiner 404 combines the wavelengths of laser light output by the optical engine 202 into a first laser light beam 902 and a second laser light beam 904, which are angularly separated from one another (e.g., by an angle of between about 0 to about 10 degrees), and outputs the first and second laser light beams 902 and 904 (sometimes referred to herein as first and second angularly separated light beams 902 and 904) toward the first scan mirror 206. In the present example, only the central rays of the first and second laser light beams 902 and 904 are shown, though it should be understood that the first and second laser light beams 902 and 904 are scanned over respective scan regions by the first and second scan mirrors 206 and 208, with the depicted central rays being centered within the scan regions. The first and second laser light beams 902 and 904 converge along the x-y dimension (with respect to the illustrated axes) to overlap (e.g., overlap with respect to the z dimension; having the same or substantially the same z-coordinates at the point or points of overlap) at a first entrance pupil plane 906 of the optical relay 210. According to various embodiments, other entrance pupil planes corresponding to a convergence of the first and second laser light beams 902 and 904 to virtual apertures along other dimensions or planes (e.g., dimensions or planes that are substantially perpendicular to the x-y dimension) may be disposed at the same or substantially the same location along the optical paths of the first and second laser light beams 902 and 904 as the first entrance pupil plane 906, or may instead be disposed at other locations along those optical paths. In the present example, the first entrance pupil plane 906 is located at a reflective surface (e.g., reflective surface 412 of FIG. 4) of the first scan mirror 206. In some embodiments, the first axis 219 about which the first scan mirror 206 is configured to oscillate is aligned or substantially aligned along the x-y dimension and substantially perpendicular to the z-axis.

The first scan mirror 206 scans the first and second laser light beams 902 and 904 into the optical relay substantially along the x-z dimension (e.g., the scanning dimension 302 of FIG. 3; the first scanning dimension 502 of FIG. 5), which is substantially orthogonal to the x-y dimension, and into the optical relay 210. Upon reflection by the first scan mirror 206, the optical paths of the first and second laser light beams 902 and 904 again diverge, becoming angularly separated along the x-y dimension. In some embodiments, the optical relay 210 magnifies each of the first and second laser light beams 902 and 904 along one or more dimensions (e.g., to circularize each of the first and second laser light beams 902 and 904). Herein, two dimensions (e.g., lines, planes, directions, or the like) are considered "substantially orthogonal" to one another when they are within about 15 degrees of orthogonality with respect to one another. The optical relay 210 relays the first and second laser light beams 902 and 904 toward the second scan mirror 208 and causes the first and second laser light beams 902 and 904 to converge along the x-y dimension and causes the scan region for each of the first and second laser light beams 902 and 904 to converge along the z dimension and their respective directions of propagation.

In the present example, first and second laser light beams 902 and 904 are incident on two respectively separate locations on the reflective surface (e.g., reflective surface 414) of the second scan mirror 208 (i.e., an exit pupil plane of the optical relay along the x-y dimension is not disposed at the second scan mirror 208). The second scan mirror 208 scans the first and second laser light beams 902 and 904 along the x-y dimension (e.g., the second scanning dimension 512 of FIG. 5) toward the incoupler 212.

Upon being reflected by the second scan mirror 208, the first and second laser light beams 902 and 904 converge along the x-y dimension to overlap (e.g., overlap with respect to the z dimension; having the same or substantially the same z-coordinates at the point or points of overlap) at a first exit pupil plane 908 of the optical relay 210. According to various embodiments, other exit pupil planes corresponding to a convergence of the first and second laser light beams 902 and 904 to virtual apertures along other dimensions or planes (e.g., dimensions or planes that are substantially perpendicular to the x-y dimension) may be disposed at the same or substantially the same location along the optical paths of the first and second laser light beams 902 and 904 as the first exit pupil plane 908, or may instead be disposed at other locations along those optical paths. In the present example, the first exit pupil plane 908 is located at the incoupler 212. In some embodiments, the first exit pupil plane 908, corresponding to convergence of the laser light beams 902 and 904 the x-y dimension, and a second exit pupil plane (not shown), corresponding to convergence of the respective scan regions of the laser light beams 902 and 904 along the z dimension, are both coincident with the incoupler 212. Additionally, the respective scan regions of the first and second laser light beams 902 and 904 each converge along the z dimension and their respective directions of propagation, such that the second scan mirror 208 scans each of the first and second laser light beams 902 and 904 along respective substantially one-dimensional paths (e.g., in a respective line or arc) at the incoupler 212 (e.g., at the first exit pupil plane 908). Herein, a "substantially one-dimensional" path refers to a path that follows a single straight line or curved line (e.g., arc).

While in the present example of FIG. 9, the first and second laser light beams 902 and 904 that are input to the optical scanner 204 are shown to be angularly separated and converge along the x-y axis at the first entrance pupil plane 906 and the first exit pupil plane 908, in some alternative embodiments of the laser projection system 900, the first and second laser light beams 902 and 904 are not angularly separated by a substantially non-zero amount and are instead parallel or collinear. In such alternative embodiments, each of the first and second laser light beams 902 and 904 undergo independent convergence (i.e., of the light of each individual beam, not necessarily with respect to the other beam) to virtual apertures along the x-y axis at the first entrance pupil plane 906 and at the first exit pupil plane 908.

Figure 10:
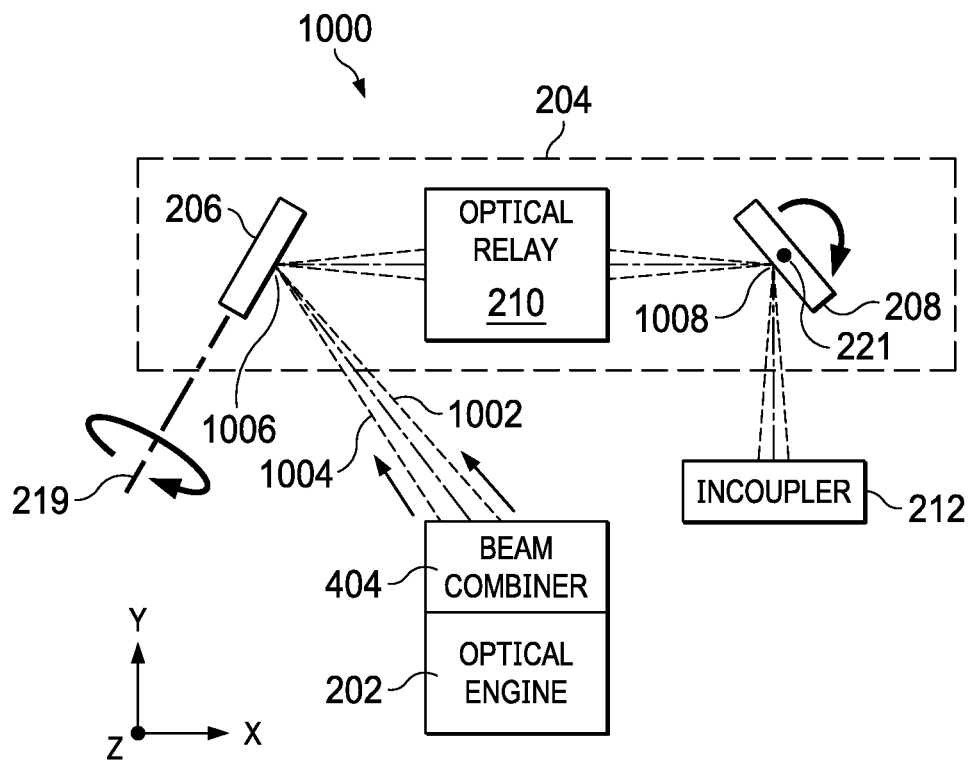
FIG. 10 is a diagram illustrating a top view of a portion of a laser projection system in which a pair of angularly separated lasers overlap at an entrance pupil plane at a first scan mirror and at an exit pupil plane at a second scan mirror, in accordance with some embodiments.

FIG. 10 shows an illustrative top-down view of a laser projection system 1000 (one embodiment of the laser projection system 200 of FIG. 2), in which a first entrance pupil plane of the optical relay 210 of the optical scanner 204 is incident with a reflective surface of the first scan mirror 206, and a first exit pupil plane of the optical relay 210 is coincident with the reflective surface of the second scan mirror 208. In the present example, the top-down view of the laser projection system 1000 is provided with respect to a three-dimensional cartesian coordinate system having respectively orthogonal x-, y-, and z-axes, where the top-down view provides the perspective of looking down the positive z-axis.

The optical engine 202 includes two or more laser light sources, each configured to output a respectively different wavelength of laser light toward the beam combiner 404. The beam combiner 404 combines the wavelengths of laser light output by the optical engine 202 into a first laser light beam 1002 and a second laser light beam 1004, which are angularly separated from one another (e.g., by an angle of about 0 to 10 degrees), and outputs the first and second laser light beams 1002 and 1004 (sometimes referred to herein as first and second angularly separated light beams 1002 and 1004) toward the first scan mirror 206. In the present example, only the central rays of the first and second laser light beams 1002 and 1004 are shown, though it should be understood that the first and second laser light beams 1002 and 1004 are scanned over respective scan regions by the first and second scan mirrors 206 and 208, with the depicted central rays being centered within the scan regions. The first and second laser light beams 1002 and 1004 converge along the x-y dimension (with respect to the illustrated axes) to overlap (e.g., overlap with respect to the z dimension; having the same or substantially the same z-coordinates at the point or points of overlap) at a first entrance pupil plane 1006 of the optical relay 210. According to various embodiments, other entrance pupil planes corresponding to a convergence of the first and second laser light beams 1002 and 1004 to virtual apertures along other dimensions or planes (e.g., dimensions or planes that are substantially perpendicular to the x-y dimension) may be disposed at the same or substantially the same location along the optical paths of the first and second laser light beams 1002 and 1004 as the first entrance pupil plane 1006, or may instead be disposed at other locations along those optical paths. In the present example, the first entrance pupil plane 1006 is located at a reflective surface (e.g., reflective surface 412 of FIG. 4) of the first scan mirror 206. In some embodiments, the first axis 219 about which the first scan mirror 206 is configured to oscillate is aligned or substantially aligned along the x-y dimension and substantially perpendicular to the z-axis.

The first scan mirror 206 scans the first and second laser light beams 1002 and 1004 into the optical relay substantially along the x-z dimension (e.g., the scanning dimension 302 of FIG. 3; the first scanning dimension 502 of FIG. 5), which is substantially orthogonal to the x-y dimension, and into the optical relay 210. Upon reflection by the first scan mirror 206, the optical paths of the first and second laser light beams 1002 and 1004 again diverge, becoming angularly separated along the x-y dimension. In some embodiments, the optical relay 210 magnifies each of the first and second laser light beams 1002 and 1004 along one or more dimensions (e.g., to circularize each of the first and second laser light beams 1002 and 1004). The optical relay 210 relays the first and second laser light beams 1002 and 1004 toward the second scan mirror 208 and causes the first and second laser light beams 1002 and 1004 to converge along the x-y dimension and causes the scan region for each of the first and second laser light beams 1002 and 1004 to converge along the z dimension and their respective directions of propagation.

Upon being output by the optical relay 210, the first and second laser light beams 1002 and 1004 converge along the x-y dimension to overlap (e.g., overlap with respect to the z dimension; having the same or substantially the same z-coordinates at the point or points of overlap) at a first exit pupil plane 1008 of the optical relay 210. In the present example, first and second laser light beams 1002 and 1004 are incident on either the same location on the reflective surface (e.g., reflective surface 414 of FIG. 4) of the second scan mirror 208 or on two different locations on the reflective surface of the second scan mirror 208 that are aligned along the z dimension. The first exit pupil plane 1008 corresponds to the location along the x-y dimension at which the first and second laser light beams 1002 and 1004 overlap. According to various embodiments, other exit pupil planes corresponding to a convergence of the first and second laser light beams 1002 and 1004 to virtual apertures along other dimensions or planes (e.g., dimensions or planes that are substantially perpendicular to the x-y dimension) may be disposed at the same or substantially the same location along the optical paths of the first and second laser light beams 1002 and 1004 as the first exit pupil plane 1008, or may instead be disposed at other locations along those optical paths. The second scan mirror 208 scans the first and second laser light beams 1102 and 1104 along the x-y dimension (e.g., the second scanning dimension 512 of FIG. 5) toward the incoupler 212.

Additionally, the respective scan regions of the first and second laser light beams 1002 and 1004 each converge along the z dimension and their respective directions of propagation, such that the second scan mirror 208 scans each of the first and second laser light beams 1002 and 1004 along respective substantially one-dimensional paths (e.g., in a respective line or arc) at the incoupler 212, corresponding to a second exit pupil plane along the x-z axis.

Because the central rays of the first and second laser light beams 1002 and 1004 are offset at the incoupler and each of the first and second laser light beams 1002 and 1004 are scanned by substantially the same amount by the second scan mirror 208, the lines or arcs over which the first and second laser light beams 1002 and 1004 are scanned by the second scan mirror 208 may only partially overlap, such that a first portion of the incoupler receives only light of the first laser light beam 1002, a second portion of the incoupler receives only light of the second laser light beam 1004, and a third portion of the incoupler (e.g., disposed between the first and second portions of the incoupler) receives light of both the first and second laser light beams 1002 and 1004.

The optical engine 202, the beam combiner 404, the first and second scan mirrors 206 and 208, and the optical relay 210 are arranged and respectively configured to cause the first exit pupil plane 1008 to be located at the reflective surface of the second scan mirror 208, rather than at the incoupler 212, which comparatively reduces the distance, along the x-y dimension, between the location at which the first laser light beam 1002 is incident on the second scan mirror 208 and the location at which the second laser light beam 1004 is incident on the second scan mirror 208. Accordingly, the size of the reflective surface of the second scan mirror 208 along the x-y dimension can be reduced because the first exit pupil plane 1008 is at the second scan mirror 208 instead of at the incoupler 212. The overall size of the second scan mirror 208 (and, therefore, the optical scanner 204 and the laser projection system 1000), can be comparatively reduced, due to the first exit pupil plane 1008 being coincident with the second scan mirror 208.

While in the present example of FIG. 10, the first and second laser light beams 1002 and 1004 that are input to the optical scanner 204 are shown to be angularly separated and converge along the x-y axis at the first entrance pupil plane 1006 and the first exit pupil plane 1008, in some alternative embodiments of the laser projection system 1000, the first and second laser light beams 1002 and 1004 are not angularly separated by a substantially non-zero amount and are instead parallel or collinear. In such alternative embodiments, each of the first and second laser light beams 1002 and 1004 undergo independent convergence (i.e., of the light of each individual beam, not necessarily with respect to the other beam) to virtual apertures along the x-y axis at the first entrance pupil plane 1006 and at the first exit pupil plane 1008.

Figure 11:
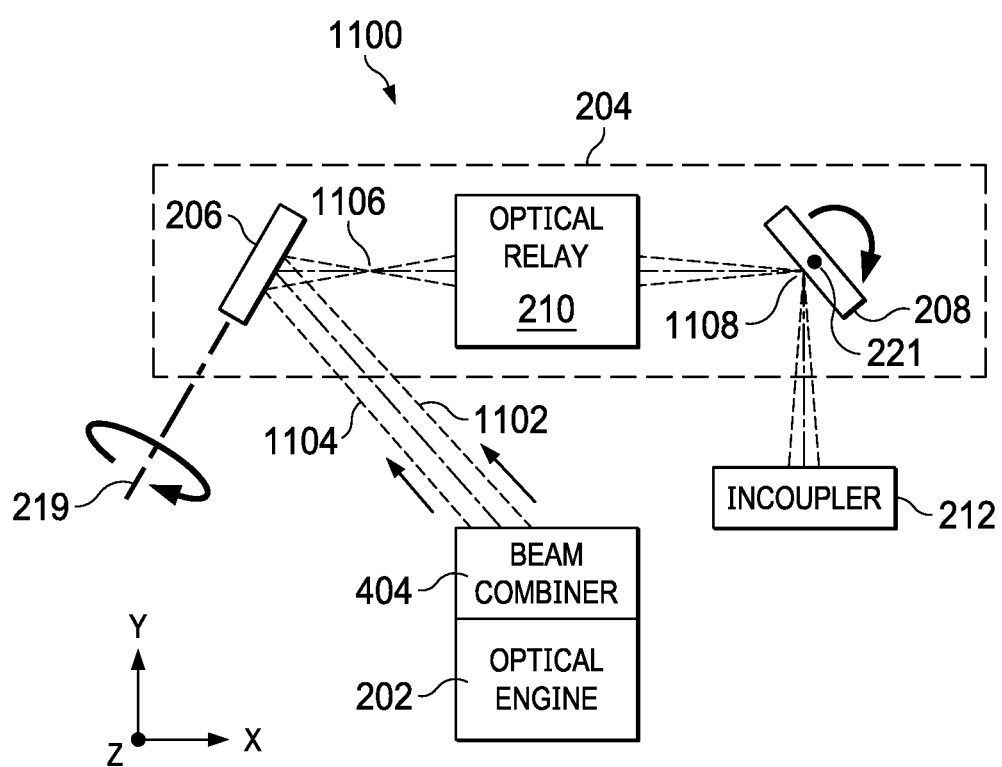
FIG. 11 is a diagram illustrating a top view of a portion of a laser projection system in which a pair of angularly separated lasers overlap at an entrance pupil plane located between a first scan mirror and an optical relay and at an exit pupil plane at a second scan mirror, in accordance with some embodiments.

FIG. 11 shows an illustrative top-down view of a laser projection system 1100 (one embodiment of the laser projection system 200 of FIG. 2), in which a first entrance pupil plane 1106 of the optical relay 210 of the optical scanner 204 is disposed between the first scan mirror 206 and the optical relay 210, and a first exit pupil plane 1108 of the optical relay 210 is coincident with a reflective surface of the second scan mirror 208. In the present example, the top-down view of the laser projection system 1100 is provided with respect to a three-dimensional cartesian coordinate system having respectively orthogonal x-, y-, and z-axes, where the top-down view provides the perspective of looking down the positive z-axis.

The optical engine 202 includes two or more laser light sources, each configured to output a respectively different wavelength of laser light toward the beam combiner 404. The beam combiner 404 combines the wavelengths of laser light output by the optical engine 202 into a first laser light beam 1102 and a second laser light beam 1104, which are angularly separated from one another (e.g., by an angle of about 0 to 10 degrees), and outputs the first and second laser light beams 1102 and 1104 (sometimes referred to herein as first and second angularly separated light beams 1102 and 1104) toward the first scan mirror 206. In the present example, only the central rays of the first and second laser light beams 1102 and 1104 are shown, though it should be understood that the first and second laser light beams 1102 and 1104 are scanned over respective scan regions by the first and second scan mirrors 206 and 208, with the depicted central rays being centered within the scan regions. The first and second laser light beams 1102 and 1104 converge along the x-y dimension (with respect to the illustrated axes) to overlap (e.g., overlap with respect to the z dimension; having the same or substantially the same z-coordinates at the point or points of overlap) at a first entrance pupil plane 1106 of the optical relay 210. According to various embodiments, other entrance pupil planes corresponding to a convergence of the first and second laser light beams 1102 and 1104 to virtual apertures along other dimensions or planes (e.g., dimensions or planes that are substantially perpendicular to the x-y dimension) may be disposed at the same or substantially the same location along the optical paths of the first and second laser light beams 1102 and 1104 as the first entrance pupil plane 1106, or may instead be disposed at other locations along those optical paths. In the present example, the first entrance pupil plane 1106 is located between the first scan mirror 206 and the optical relay 210 (e.g., rather than being disposed directly at the first scan mirror 206, in contrast with the example of FIG. 9).

The first scan mirror 206 scans the first and second laser light beams 1102 and 1104 into the optical relay substantially along the x-z dimension (e.g., the scanning dimension 302 of FIG. 3; the first scanning dimension 502 of FIG. 5), which is substantially orthogonal to the x-y dimension, and into the optical relay 210. Upon reflection by the first scan mirror 206 and after converging to the first entrance pupil plane 1106, the optical paths of the first and second laser light beams 1102 and 1104 again diverge, becoming angularly separated along the x-y dimension. In some embodiments, the optical relay 210 magnifies each of the first and second laser light beams 1102 and 1104 along one or more dimensions (e.g., to circularize each of the first and second laser light beams 1102 and 1104). The optical relay 210 relays the first and second laser light beams 1102 and 1104 toward the second scan mirror 208 and causes the first and second laser light beams 1102 and 1104 to converge along the x-y dimension and causes the scan region for each of the first and second laser light beams 1102 and 1104 to converge along the z dimension and their respective directions of propagation.

Upon being output by the optical relay 210, the first and second laser light beams 1102 and 1104 converge along the x-y dimension to overlap (e.g., overlap with respect to the z dimension; having the same or substantially the same z-coordinates at the point or points of overlap) at a first exit pupil plane 1108 of the optical relay 210. In the present example, first and second laser light beams 1102 and 1104 are incident on either the same location on the reflective surface (e.g., reflective surface 414 of FIG. 4) of the second scan mirror 208 or on two different locations on the reflective surface of the second scan mirror 208 that are aligned along the z dimension. The first exit pupil plane 1108 corresponds to the location along the x-y dimension at which the first and second laser light beams 1102 and 1104 overlap. According to various embodiments, other exit pupil planes corresponding to the convergence of the first and second laser light beams 1102 and 1104 to virtual apertures along other dimensions or planes (e.g., dimensions or planes that are substantially perpendicular to the x-y dimension) may be disposed at the same or substantially the same location along the optical paths of the first and second laser light beams 1102 and 1104 as the first exit pupil plane 1108, or may instead be disposed at other locations along those optical paths. The second scan mirror 208 scans the first and second laser light beams 1102 and 1104 along the x-y dimension (e.g., the second scanning dimension 512 of FIG. 5) toward the incoupler 212.

Additionally, the respective scan regions of the first and second laser light beams 1102 and 1104 each converge along the z dimension and their respective directions of propagation, such that the second scan mirror 208 scans each of the first and second laser light beams 1102 and 1104 along respective substantially one-dimensional paths (e.g., in a respective line or arc) at the incoupler 212, corresponding to a second exit pupil plane along the x-z axis.

Because the central rays of the first and second laser light beams 1102 and 1104 are offset at the incoupler and each of the first and second laser light beams 1002 and 1004 are scanned by substantially the same amount by the second scan mirror 208, the lines or arcs over which the first and second laser light beams 1102 and 1104 are scanned by the second scan mirror 208 may only partially overlap, such that a first portion of the incoupler receives only light of the first laser light beam 1102, a second portion of the incoupler receives only light of the second laser light beam 1104, and a third portion of the incoupler (e.g., disposed between the first and second portions of the incoupler) receives light of both the first and second laser light beams 1102 and 1104.

The optical engine 202, the beam combiner 404, the first and second scan mirrors 206 and 208, and the optical relay 210 are arranged and respectively configured to cause the first entrance pupil plane 1106 to be located between the reflective surface of the first scan mirror 206 and the optical relay 210, rather than directly coincident with the reflective surface of the first scan mirror 206. By moving the first entrance pupil plane 1106 off of the first scan mirror 206 in this way, the impact of optical aberrations resulting from non-idealities (e.g., scratches, dust, and the like) at the reflective surface of the first scan mirror 206 on the optical quality of the laser projection system 1100 is reduced.

The optical engine 202, the beam combiner 404, the first and second scan mirrors 206 and 208, and the optical relay 210 are arranged and respectively configured to cause the first exit pupil plane 1108 to be located at the reflective surface of the second scan mirror 208, rather than at the incoupler 212, which comparatively reduces the distance, along the x-y dimension, between the location at which the first laser light beam 1102 is incident on the second scan mirror 208 and the location at which the second laser light beam 1104 is incident on the second scan mirror 208. Accordingly, the size of the reflective surface of the second scan mirror 208 along the x-y dimension can be reduced because the first exit pupil plane 1108 is at the second scan mirror 208 instead of at the incoupler 212. The overall size of the second scan mirror 208 (and, therefore, the optical scanner 204 and the laser projection system 1100), can be comparatively reduced, due to the first exit pupil plane 1108 being coincident with the second scan mirror 208.

While in the present example of FIG. 11, the first and second laser light beams 1102 and 1104 that are input to the optical scanner 204 are shown to be angularly separated and converge along the x-y axis at the first entrance pupil plane 1106 and the first exit pupil plane 1108, in some alternative embodiments of the laser projection system 1100, the first and second laser light beams 1102 and 1104 are not angularly separated by a substantially non-zero amount and are instead parallel or collinear. In such alternative embodiments, each of the first and second laser light beams 1102 and 1104 undergo independent convergence (i.e., of the light of each individual beam, not necessarily with respect to the other beam) to virtual apertures along the x-y axis at the first entrance pupil plane 1106 and at the first exit pupil plane 1108.

Various embodiments described above are provided in the context of generating and routing laser light through an optical system. However, it should be understood that, in addition to or in place of such laser light and corresponding laser light sources, other applicable collimated light sources and corresponding light may be used in conjunction with the described embodiments.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:
1. A laser projection system comprising:
an optical relay configured to receive and relay a first laser light beam and a second laser light beam, wherein the first laser light beam and the second laser light beam are to be angularly separated when the first laser light beam and the second laser light beam are scanned into the optical relay;
a first scan mirror configured to scan at least one of the first laser light beam and the second laser light beam into the optical relay; and
a second scan mirror configured to receive the first laser light beam and the second laser light beam from the optical relay and to scan the first laser light beam and the second laser light beam, wherein the first laser light beam and the second laser light beam are to converge along a first dimension to overlap at the second scan mirror.

2. The laser projection system of claim 1, wherein the first laser light beam and the second laser light beam are to converge along the first dimension to overlap at the first scan mirror.

3. The laser projection system of claim 1, wherein the first laser light beam and the second laser light beam are to converge along the first dimension to overlap at a location between the first scan mirror and the optical relay.

4. The laser projection system of claim 1, further comprising:
an optical engine comprising a plurality of light sources, each configured to output a respectively different wavelength of laser light; and
a beam combiner configured to receive the wavelengths of laser light from the optical engine and to combine the wavelengths of laser light to produce the first laser light beam and the second laser light beam, such that the first laser light beam and the second laser light beam are to be angularly separated with respect to one another and are to be directed toward the first scan mirror.

5. The laser projection system of claim 1, further comprising:
a waveguide comprising an incoupler;
wherein the first scan mirror is configured to scan the first laser light beam and the second laser light beam along a first scanning dimension that is substantially orthogonal to the first dimension;
wherein the second scan mirror is configured to scan the first laser light beam and the second laser light beam along a second scanning dimension that is different from the first scanning dimension;
wherein a region at which the first laser light beam and the second laser light beam are to overlap at the second scan mirror corresponds to a first exit pupil plane of the optical relay; and
wherein the optical relay is configured to cause respective scan regions of the first laser light beam and the second laser light beam to converge to respective and substantially one-dimensional paths that correspond to a second exit pupil plane of the optical relay and that are each disposed at the incoupler.

6. The laser projection system of claim 1, wherein the optical relay is configured to reshape cross-sections of each of the first laser light beam and the second laser light beam by magnifying each of the first laser light beam and the second laser light beam in at least one of a first direction and a second direction, wherein the first direction is substantially orthogonal to the second direction.

7. A near-eye display comprising the laser projection system of claim 1, and further comprising:
an eyeglasses frame that surrounds at least a portion of the laser projection system; and
an eyeglasses lens, wherein the laser projection system is configured to output the first laser light beam and the second laser light beam through at least a portion of the eyeglasses lens.

8. A near-eye display comprising:
laser projection system comprising:
a first scan mirror configured to scan angularly separated laser light beams along a first scanning dimension;
an optical relay configured to receive the angularly separated laser light beams from the first scan mirror and to relay the angularly separated laser light beams, wherein the angularly separated laser light beams are to be angularly separated in the optical relay; and
a second scan mirror configured to scan the angularly separated laser light beams, along a second scanning dimension, wherein the angularly separated laser light beams are to converge along a first dimension to a first exit pupil plane located at the second scan mirror.

9. The near-eye display of claim 8, wherein the angularly separated laser light beams are to converge along the first dimension to a first entrance pupil plane located at the first scan mirror.

10. The near-eye display of claim 8, wherein the angularly separated laser light beams are to converge along the first dimension to a first entrance pupil plane located between the first scan mirror and the optical relay.

11. The near-eye display of claim 8, further comprising:
an optical engine comprising a plurality of light sources, each configured to output a respectively different wavelength of laser light; and
a beam combiner configured to receive the wavelengths of laser light from the optical engine and to combine the wavelengths of laser light to produce angularly separated laser light beams, such that the angularly separated laser light beams are to be directed toward the first scan mirror.

12. The near-eye display of claim 8, further comprising:
a waveguide comprising an incoupler;
wherein the first scanning dimension is substantially orthogonal to the first dimension;
wherein the second scanning dimension is different from the first scanning dimension; and
wherein the optical relay is configured to cause respective scan regions of the angularly separated laser light beams to converge to respective and substantially one-dimensional paths that correspond to a second exit pupil plane of the optical relay and that are each disposed at the incoupler.

13. The near-eye display of claim 8, wherein the optical relay is configured to reshape cross-sections of each of the angularly separated laser light beams by magnifying each of the angularly separated laser light beams in at least one of a first direction and a second direction, wherein the first direction is substantially orthogonal to the second direction.

14. The near-eye display of claim 8, and further comprising:
an eyeglasses frame that surrounds at least a portion of the laser projection system; and
an eyeglasses lens, wherein the laser projection system is configured to output the angularly separated laser light beams through at least a portion of the eyeglasses lens.

15. A method comprising:
scanning, with a first scan mirror, angularly separated laser light beams along a first scanning dimension;

receiving, with an optical relay from the first scan mirror, the angularly separated laser light beams from the first scan mirror;

relaying, with the optical relay, the angularly separated laser light beams such that the angularly separated laser light beams converge along a first dimension to a first exit pupil plane; and scanning, with a second scan mirror, the angularly separated laser light beams, relayed by the optical relay, along a second scanning dimension, wherein the first exit pupil plane is located at the second scan mirror.

16. The method of claim 15, further comprising:

generating, with a plurality of light sources of an optical engine, wavelengths of laser light; and combining, with a beam combiner, the wavelengths of laser light generated by the optical engine to produce the angularly separated laser light beams.

17. The method of claim 16, wherein combining the wavelengths of laser light comprises:

combining, with the beam combiner, the wavelengths of laser light generated by the optical engine to produce the angularly separated laser light beams, such that the angularly separated laser light beams converge to a first entrance pupil plane located at the first scan mirror.

18. The method of claim 16, wherein combining the wavelengths of laser light comprises:

combining, with the beam combiner, the wavelengths of laser light generated by the optical engine to produce the angularly separated laser light beams, such that the angularly separated laser light beams converge to a first entrance pupil plane located between the first scan mirror and the optical relay.

19. The method of claim 15, wherein the first scanning dimension that is substantially orthogonal to the first dimension, and the second scanning dimension is different from the first scanning dimension, the method further comprising:

causing, with the optical relay, respective scan regions of the angularly separated laser light beams to converge to respective and substantially one-dimensional paths that correspond to a second exit pupil plane of the optical relay and that are each disposed at an incoupler of a waveguide.

20. The method of claim 15, further comprising:

reshaping, with the optical relay, cross-sections of each of the angularly separated laser light beams by:

magnifying each of the angularly separated laser light beams in at least one of a first direction and a second direction, wherein the first direction is substantially orthogonal to the second direction.

21. The method of claim 15, further comprising:

outputting the angularly separated laser light beams through at least a portion of an eyeglasses lens.

\* \* \* \* \*